(12) United States Patent
Trickel

(10) Patent No.: US 8,515,864 B2
(45) Date of Patent: *Aug. 20, 2013

(54) PAY REQUEST SYSTEM

(76) Inventor: John P. Trickel, Grimes, IA (US)

(*) Notice: Subject to any disclaimer, the term of this patent is extended or adjusted under 35 U.S.C. 154(b) by 30 days.

This patent is subject to a terminal disclaimer.

(21) Appl. No.: 13/051,642

(22) Filed: Mar. 18, 2011

(65) Prior Publication Data

US 2011/0313920 A1 Dec. 22, 2011

Related U.S. Application Data

(63) Continuation-in-part of application No. 11/429,081, filed on May 5, 2006, now Pat. No. 7,933,790.

(51) Int. Cl.
    *G06Q 10/00* (2012.01)
(52) U.S. Cl.
    USPC ............................................. 705/39; 705/35
(58) Field of Classification Search
    USPC ........................................................ 705/35, 39
    See application file for complete search history.

(56) References Cited

U.S. PATENT DOCUMENTS

| | | | |
|---|---|---|---|
| 2005/0222923 A1* | 10/2005 | Lambright | 705/30 |
| 2005/0289051 A1* | 12/2005 | Allin et al. | 705/40 |
| 2006/0044307 A1* | 3/2006 | Song | 345/419 |
| 2006/0085322 A1* | 4/2006 | Crookshanks | 705/37 |
| 2006/0149687 A1* | 7/2006 | McLemore | 705/400 |
| 2006/0173750 A1* | 8/2006 | Naley et al. | 705/26 |

* cited by examiner

*Primary Examiner* — Thomas L Mansfield, Jr.
(74) *Attorney, Agent, or Firm* — Camille L. Urban

(57) ABSTRACT

This web enabled system is capable of facilitating the management of unlimited projects within which an unlimited number of parties may participate to complete an unlimited number of stages, substages and tasks. The system facilitates the efficient disbursal of monies while reducing the inefficiencies that result when money is not timely disbursed. It uses a quasi-escrow system to secure waivers and distribute money simultaneously. Projected timelines for completion, tracking of materials used and materials stored, and partial payments and releases are all managed by the system based on inputs by participating parties. Allowed inputs are governed by each party's function and the password security level provided therefore, in balance with checks against required approvals or releases by other affected parties and intrasystem consistency checks.

18 Claims, 35 Drawing Sheets

Applicant System

Figure 1:
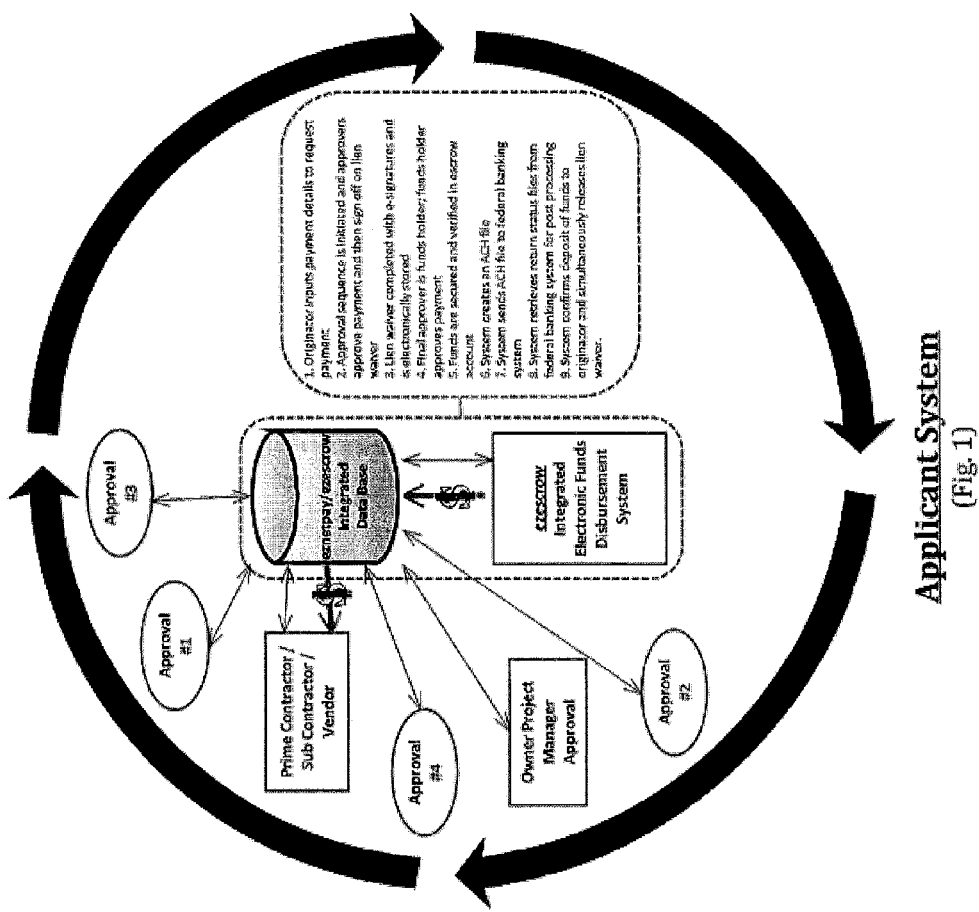

```
https://go.eznetpay.com/?PayAppId=3370&PhaseId=390&ContractValue=100000 - Retainag...
```

RETAINAGE RELEASE                                       [?]   SAVE AND CLOSE   CLOSE
PAYMENT HOLD SUMMARY

*(Insert value in one; the remaining will calculate)*

| | | |
|---:|---:|:---|
| CLAIM SUMMARY: | | |
| Payment Hold Multiplier: | | 1.0 |
| Claims on File: | $0.00 | $0.00 |
| Incomplete Work Multiplier: | | 1.0 |
| Incomplete/Remaining Work: | $0.00 | $0.00 |
| TOTAL PAYMENT HOLD: | $0.00 | |

*(Insert value in one; the remaining will calculate)*

| | | |
|---:|---:|:---|
| RETAINAGE RELEASE: | | |
| Reduce retainage from $4,137.50 to $ | | 4,137.50 |
| or from 4.1375% to | | 4   % |
| Retainage Release Amount | | 0.00 |
| RETAINAGE SUMMARY: | | |
| Current: | 4,137.50 | |
| (Total Holds): | $0.00 | |
| (Amount Released): | 1,000.00 | |
| Balance: | 3,137.50 | |
| CURRENT PAYMENT DUE: | 1,000.00 | |

Done    ✓ Trusted sites | Protected Mode: Off    100%

Fig. 10

PAY REQUEST SYSTEM

CROSS-REFERENCE TO RELATED APPLICATION

This application is a continuation-in-part of application Ser. No. 11/429,081 filed in the United States Patent and Trademark Office on May 5, 2006, which issued as U.S. Pat. No. 7,933,790 on Apr. 26, 2011, the entire contents of which is herein incorporated by reference.

FIELD OF INVENTION

Complex task management system for multiple parties providing multiple services or paying for them, in a multiple stage project including facilitation of partial payments and approvals therefore.

BACKGROUND OF THE INVENTION

Contracts pertaining to tasks and projects can involve multiple parties providing services, funding, and loan services and involve multiple stages with a host of imbedded timelines. Like dominoes, completion of the whole project depends on accurate performance of activities and timing that makes up the parts. Although all of this information can and has been tracked on paper or by computer in the past, "tracking" in the passive sense, did not provide the pro-active prompts necessary to keep a project moving toward completion nor a dynamic interface providing real time changes and interaction by participating parties.

The design and construction industries are highly fragmented and are riddled with inefficiencies, the largest one being how to get paid on a timely basis so that progress on the project can continue. There are conflicting interests relative to the signing of releases, provision of payment to subcontractors and vendors, and the distribution of money to contractors without a means to assure it is properly distributed to those needing payment. Generally, getting paid for services will require a contract and a schedule of values to invoice against over the contract period. The normal turn around time for partial payment in this environment can exceed 45 days, sometimes 90 days. Moreover, the process of requesting payment, obtaining approvals therefore, and transfer of funds is not consistent month to month. The number of man hours spent per year tracking documents necessary to effect all the partial payments in a large project is staggering. What was needed was a system accessible by all parties that could facilitate the dynamic management of the tasks, materials, and scheduling, and also provide a way to shorten the turn around time from bill to payment for recurring payments.

In addition to design and construction, facilities management, legal services, financial services, product development and manufacturing all present the same need i.e. the need to manage recurring payments for long term service contracts. This need requires a remedy for the exchange of money for services wherein money will only be paid upon release by the payee of any obligations to pay and the release will only be provided upon receipt of payment.

The objectives of the present invention are:

To provide a web-enabled pay application service to expedite, organize and synchronize the payment process between payors and service provides wherein each is a party to a contract.

To facilitate any contract for services that requires a recurring pay request, approval sequences and disbursements.

To automatically prepare, forward and execute an authorized lien waiver as part of the payment process;

To minimize the time and tasks presently required to obtain waivers and complete payments.

To reduce error associated with inaccuracies of multiple entries and recordkeeping, provide automatic email notification of process steps in the payment process, create a paperless process facilitated by digital signature sign-offs and provide password-keyed variable access to different parts of the system based on the identity and function of the party holding the password.

To allow full reporting capabilities to monitor on-going changes to schedule of values, budgets, completion, materials, etc.

To allow for multiple parties to integrate into a master pay request including sub contractors and vendors.

To provide a "bill pay" option to release funds to sub contractors or vendors.

BRIEF SUMMARY OF THE INVENTION

The present invention comprises a web enabled system capable of facilitating the management of unlimited projects within which an unlimited number of parties may participate to complete an unlimited number of stages, substages and tasks. The system facilitates the efficient disbursal of monies while reducing the inefficiencies that result when money is not timely disbursed. Projected timelines for completion, tracking of materials used and materials stored, and partial payments and releases are all managed by the system based on inputs by participating parties. Allowed inputs are governed by each party's function and the password security level provided therefore, in balance with checks against required approvals or releases by other affected parties and intrasystem consistency checks.

For example, a party providing drywall services may only be allowed access to the substages in which it is engaged to provide services and then, perhaps, only to certain fields relevant to reporting task completion, materials used, change requests, and payment requests. In contrast, a general contractor may have access to all substages but, although not allowed to input progress data regarding task completion by a subcontractor, will be required to approve the progress data input by that sub. A party providing finances for the project may have read-only access to the vast majority of the system's functions and have active access only to review, comment, approve, reject and actuate release of funds. The system here acts as the transfer agent for funds and waivers. The variations in accessibility are governed by password protected security levels.

As the project is begun, those parties from whom approval or signature will be required will agree that his signature be electronically applied (not sure what your saying here. We use scanned images of signatures for DMPS. We have discontinued the use of having Approver or originators sign a sheet of paper and then scan in and upload for use. It's a formality that is not required when your already authenticated at the log in and password level or are you saying that the User needs to be "signed up" and "authenticated" to get the log in and password in the first place? If yes, then the "System" will do this before people are inserted into projects and contracts.) upon the signor's activation of a password-protected confirmation and that, upon such application, the electronic signature will be binding as if he had signed it physically.

The system is multi-relational such that a switch/flag/indicator can be set so that a change in a particular field will be reflected in another field or will be used to re-calculate a value in another field. For example, if a particular task cannot begin until a first task is completed, the system can be set so that if progress in the first task is slowed, the target dates of the other are changed accordingly, necessary and affected parties are so notified, and approval of the change it obtained from the approving party. Materials stored balances are maintained and "red flag" alerts are provided. This system is unique in that it tracks materials relative to the purchase date and use date of each particular lot of goods rather than storing a present inventory versus a total.

If a pay request goes without response, the system will email a reminder to the recipient of the request. For example, if a pay request is denied, the status of that request is presented to the requestor in a manner that draws its attention. As tasks or substages are completed for which partial payments are due, the appropriate party calls up a form pre-populated with substage information, enters the date and portion completed and requests payment. The system uses a predetermined authentication routine to deliver the request to a pre-determined approver or approvers. Prior to sending the pay request, the requester is presented with the digital Lien Waiver form with all relevant information about the request pre populated. The form is generated by the system reflective of the pay request data and may only require the signor to actuate his electronic signature. The requestor must sign the Lien Waiver again to complete the pay request process. Requiring the signature at this point in time means the requestor completes all entry in the system at one time and simply waits to be paid. The electronically signed Lien Waiver is held by the system and can only be forwarded to the recipient when funds are forwarded to the requestor, or can be deleted if the request for payment is rejected. The Lien Waiver is otherwise inaccessible.

The approver then checks the work and approves (or disapproves) payment. As part of the approver approval process, the approver must also sign the pay request and the Lien Waiver as proof the Lien Waiver has indeed been reviewed. At this point, the system alerts the requester that approval was made. Then the system alerts the payor of the requested amount, its approval status, and of the completed lien waiver form. Payor releases funds to the system; the system verifies the amount transferred matches that approved on the pay request, and then simultaneously sends the lien waiver form and the funds to the respective destinations. This negates the need for a double signature or temporary release form (one before payment received and a final one after) and ensures fast, reliable payment upon completion of Lien Waiver. When the system is set up to pay vendors and subcontractors as is preferable, the funds go directly to the recipient and do not get paid to the contractor's account wherein the contractor would be required to take additional steps to forward to the subcontractor or vendor.

In an alternative arrangement, once the requestor receives funds, he can use a function similar to an online bank bill pay function to transfer funds for direct deposit to pay subcontractors or vendors that may not have been entered as pay requestors on the system.

Reports generated by the system upon command are many and varied. Running balances; retainage per task, substage, and overall; task completion reports; vendor status and service supplier status across tasks and subtasks; and Next Pay App reports are all available and can be set to autogenerate at predetermined times or on command. In addition, the system stores and makes available read only copies of project documents e.g. subcontracts, vendor agreements, lender documents, and others.

DETAILED DRAWINGS

Figure 2:
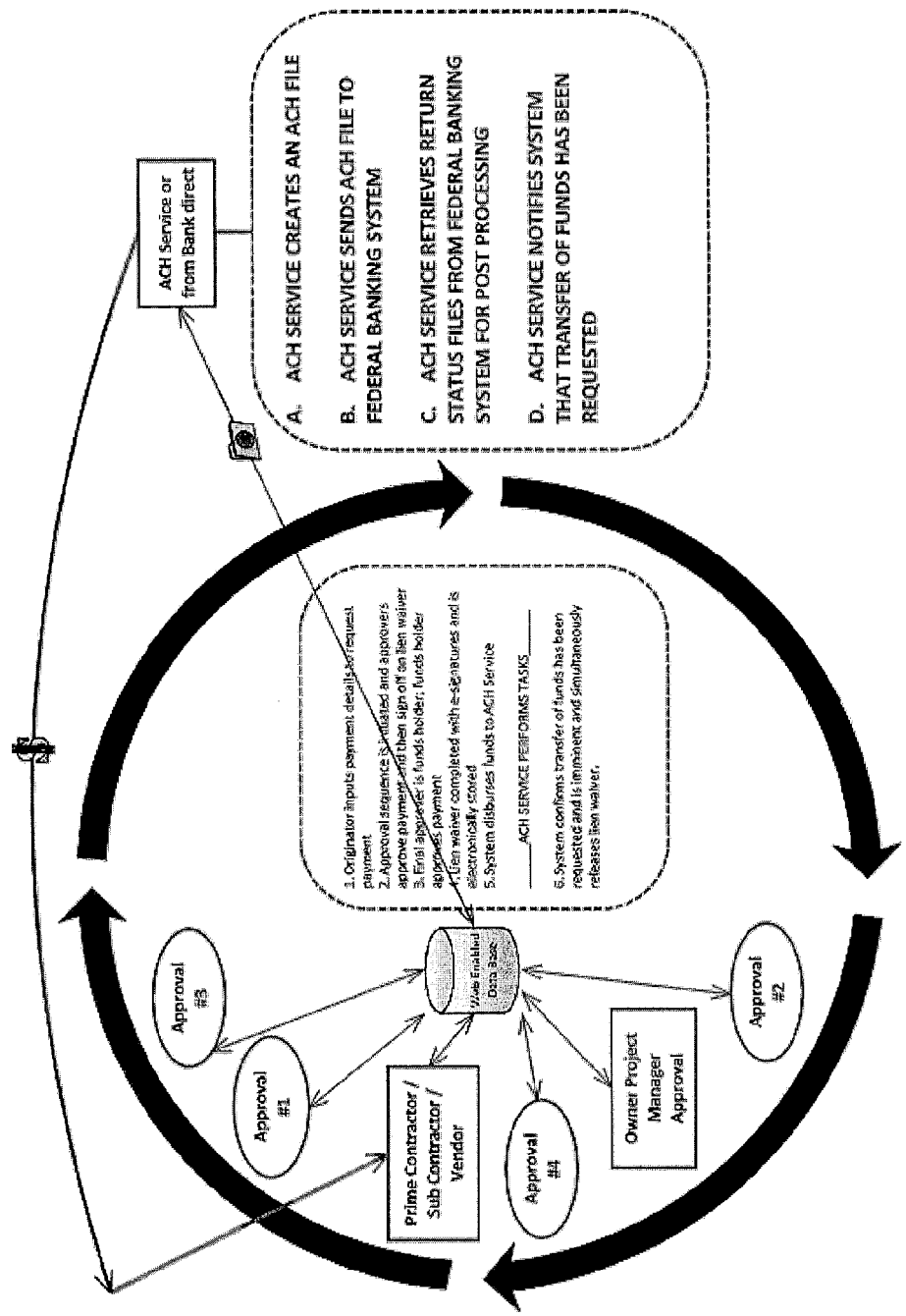
Figure 3:
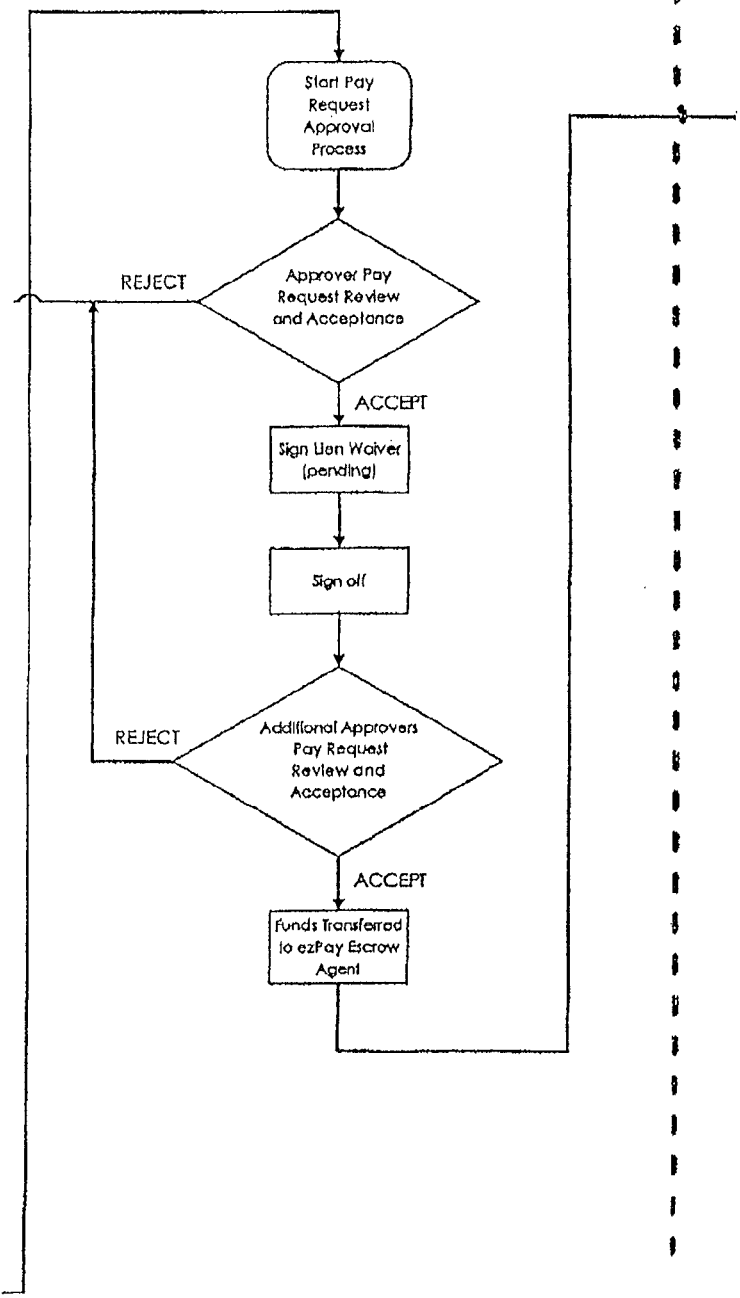
Figure 4:
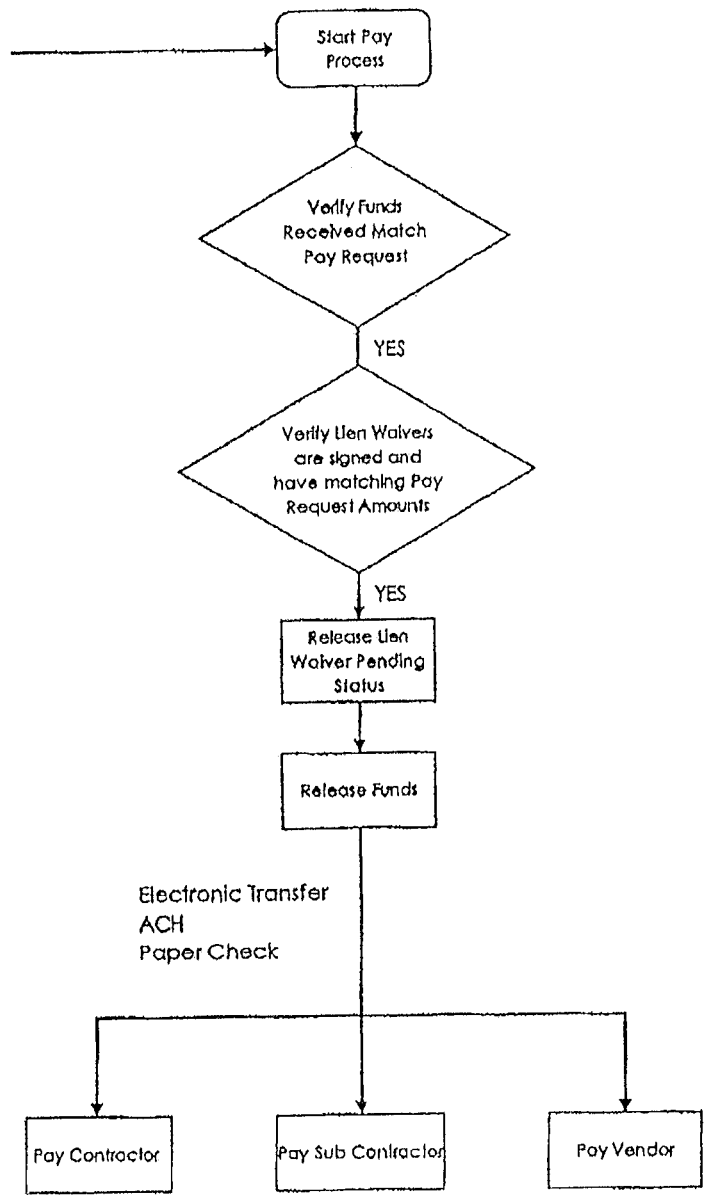
Figure 5:
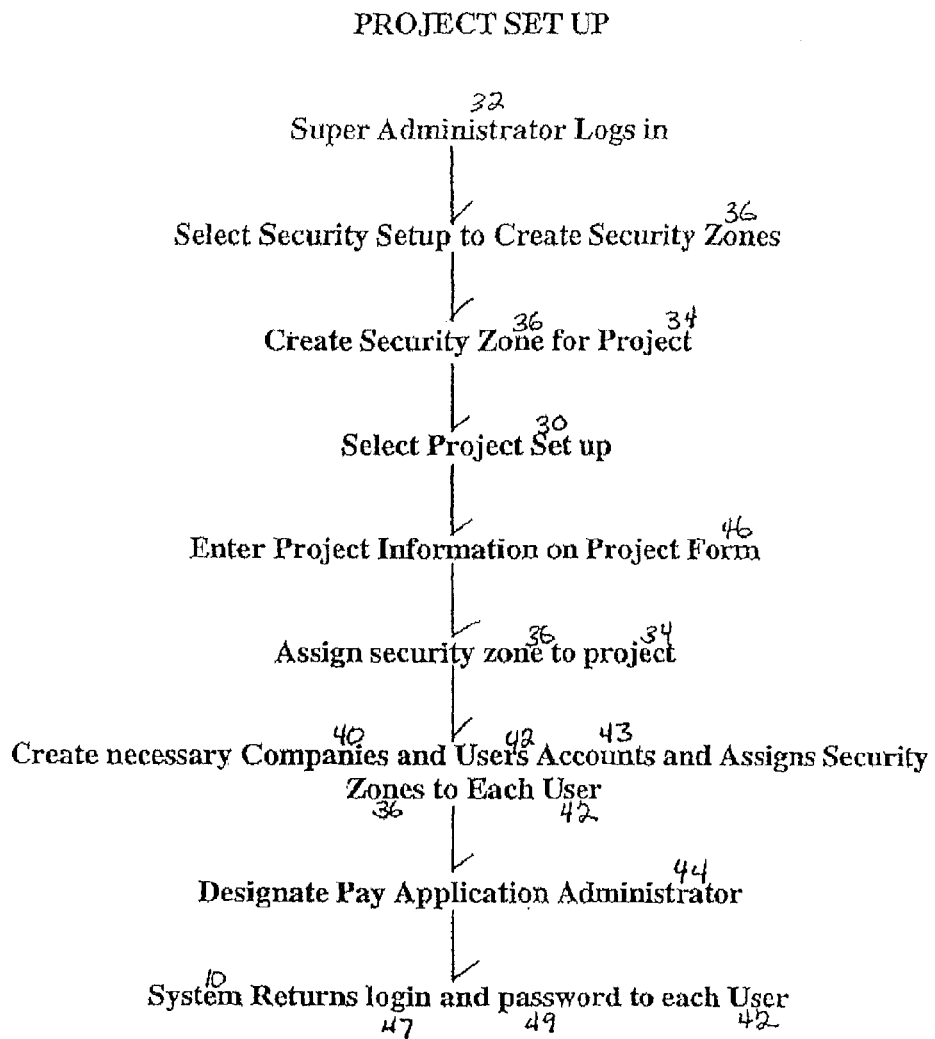
Figure 5A:
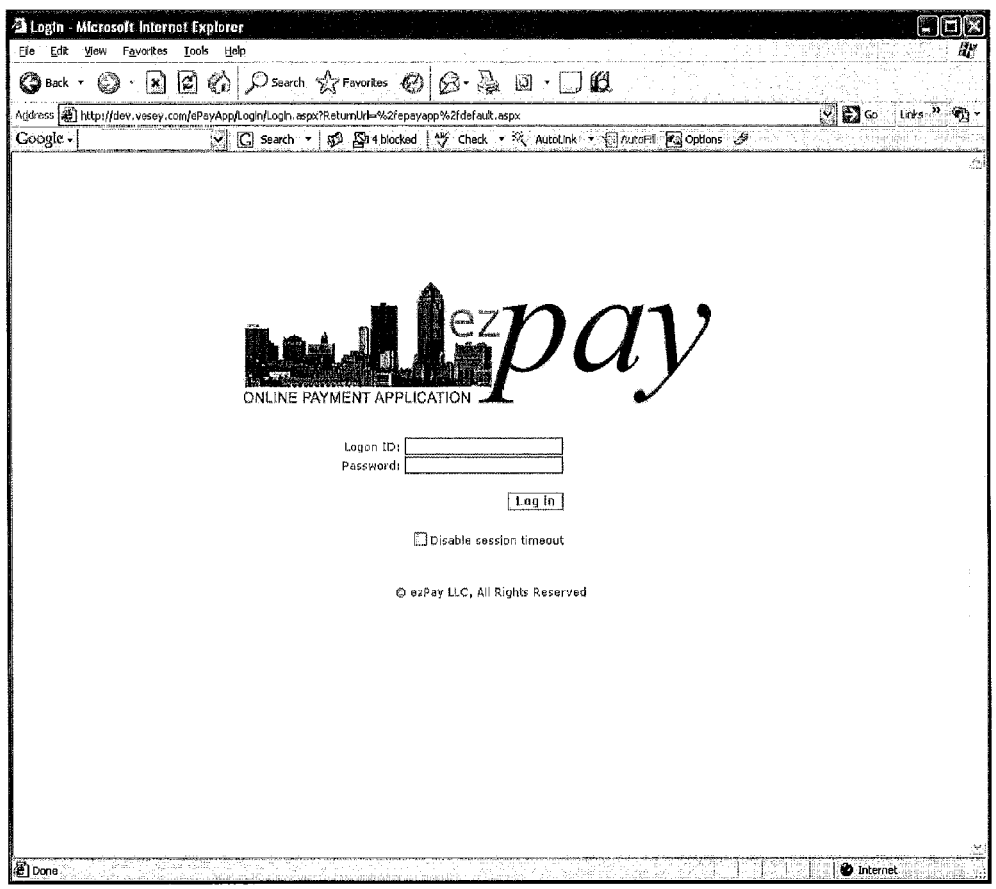
Figure 5B:
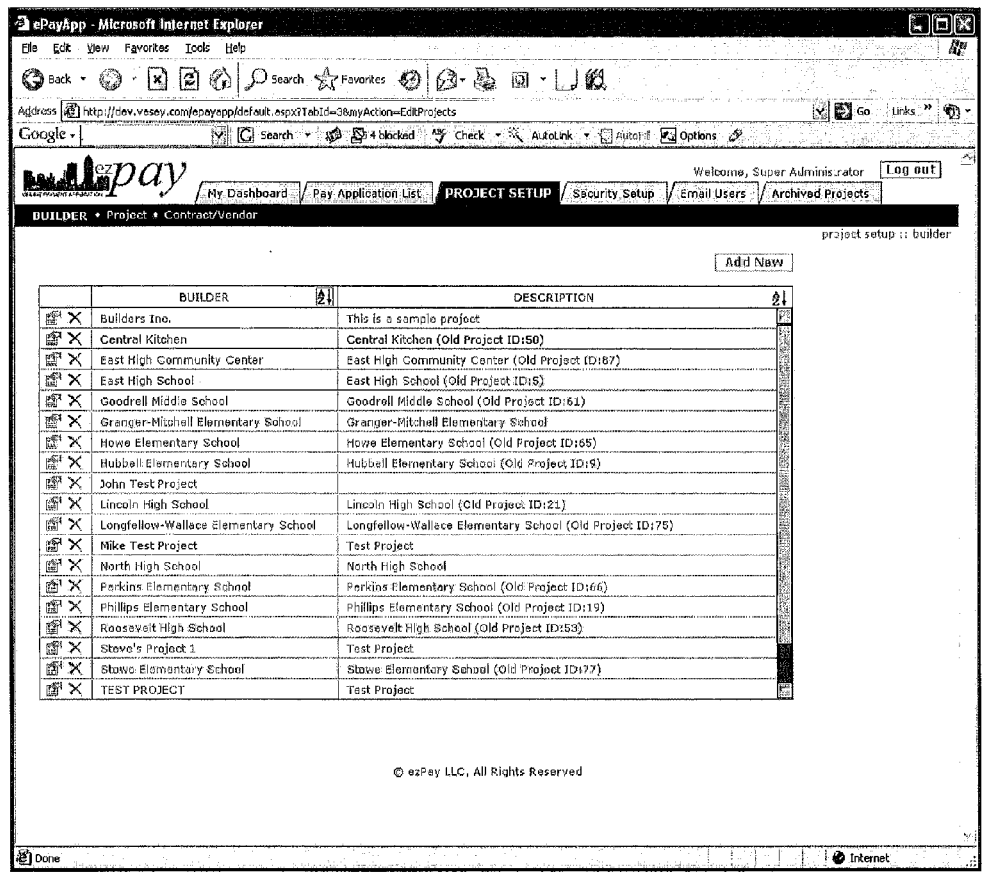
Figure 5C:
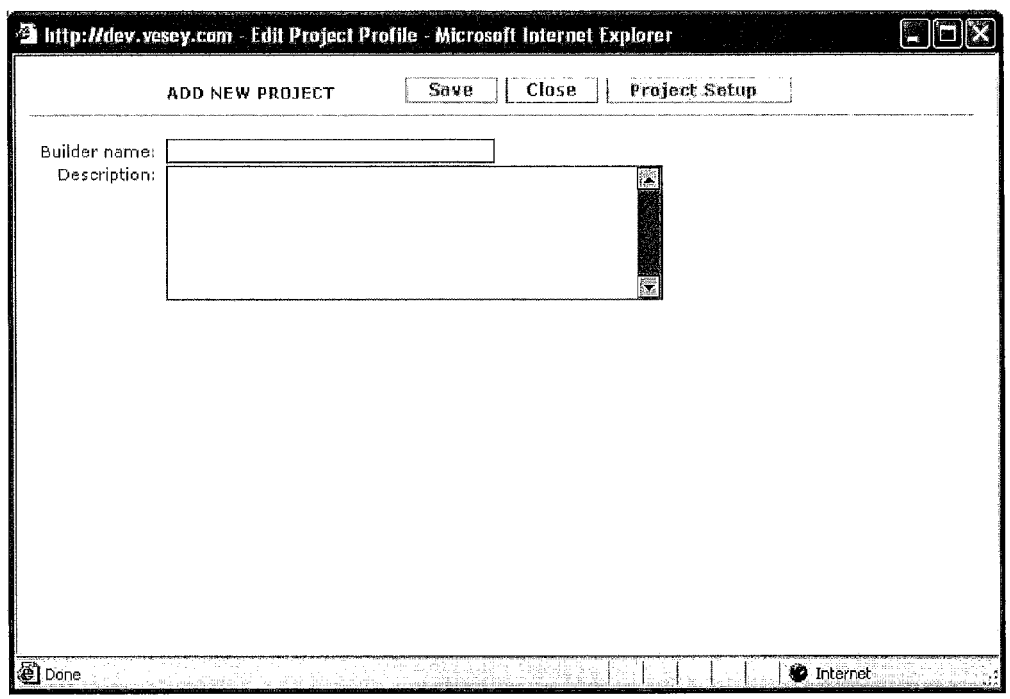
Figure 5D:
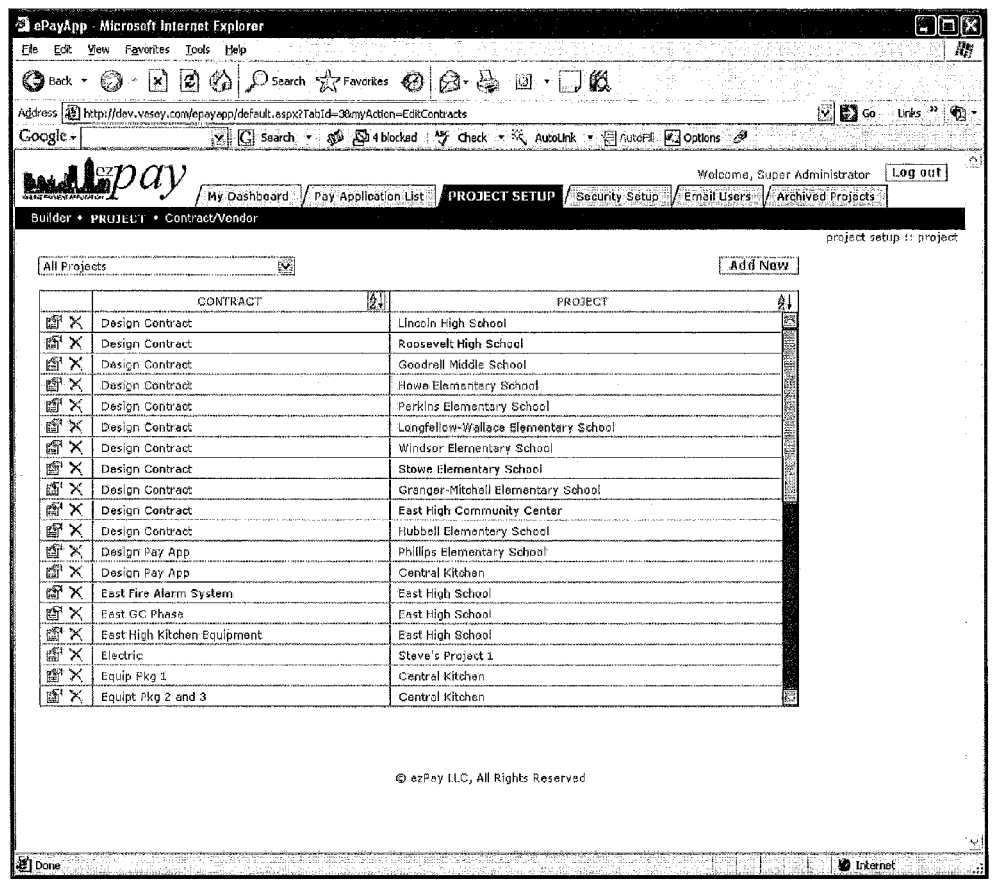
Figure 5H:
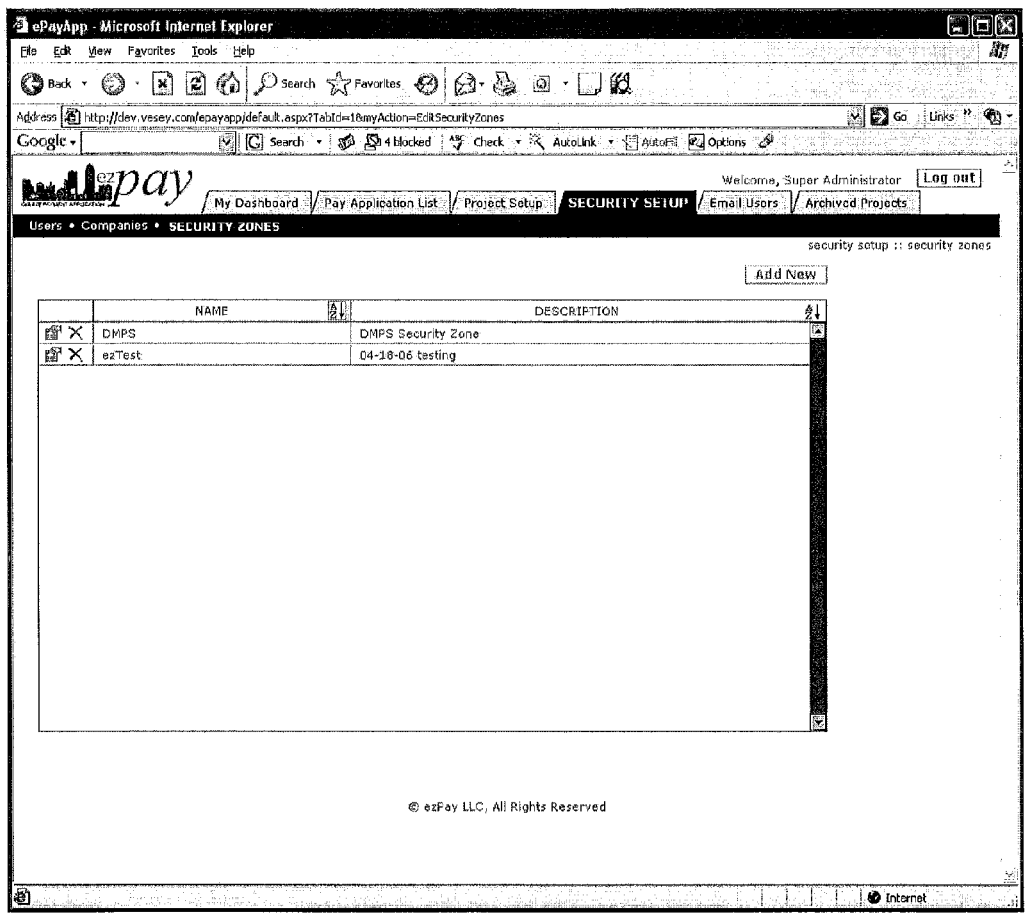
Figure 5I:
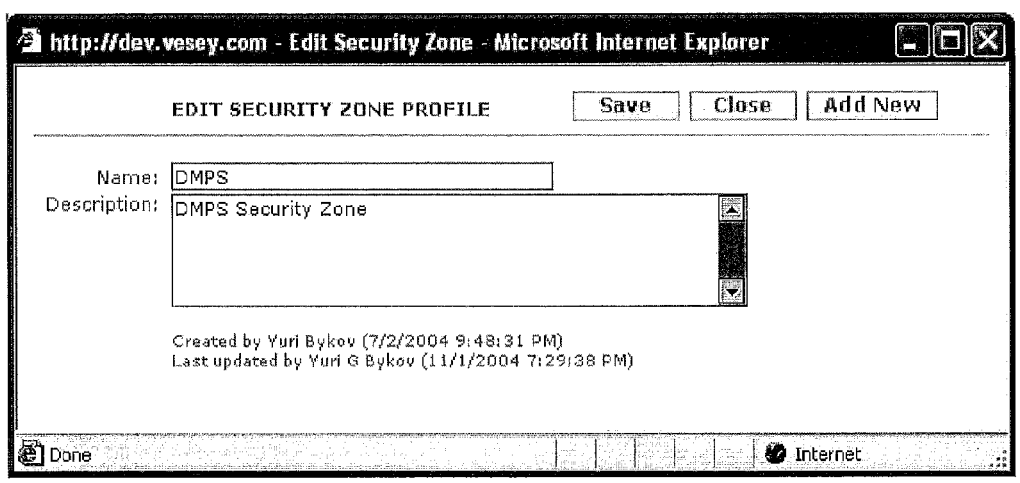
Figure 5J:
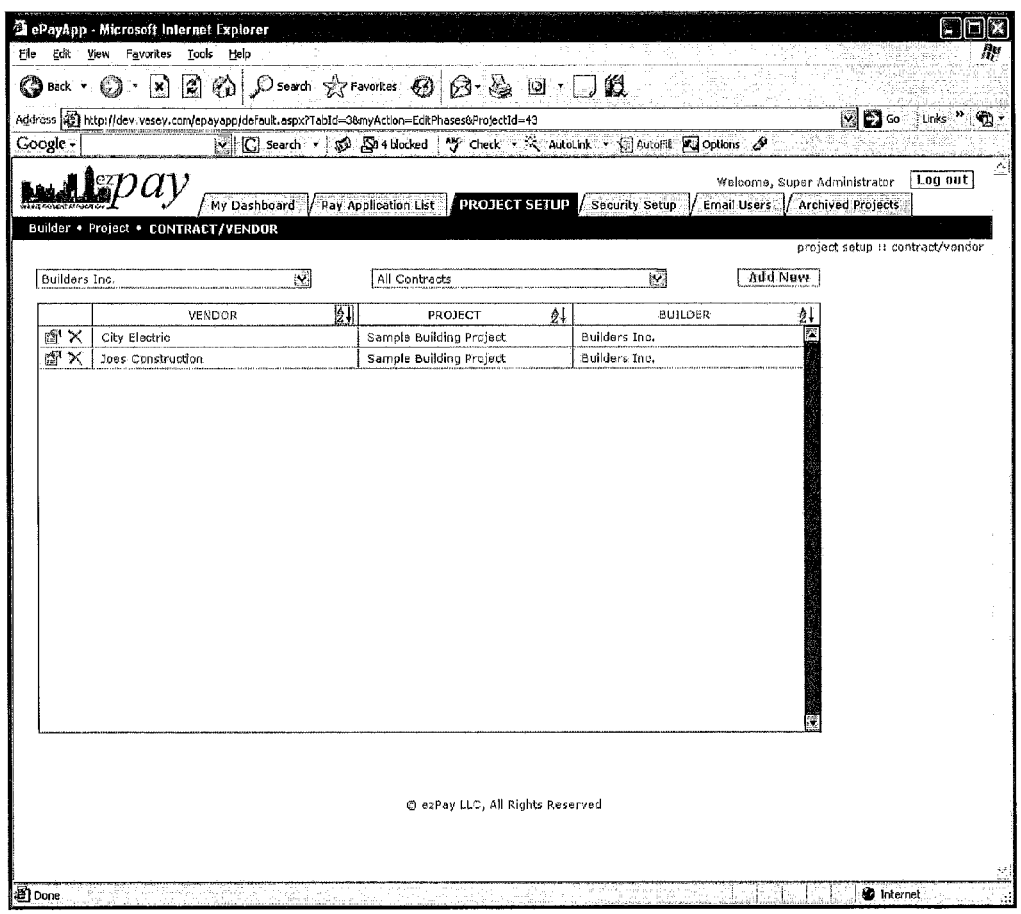
Figure 6:
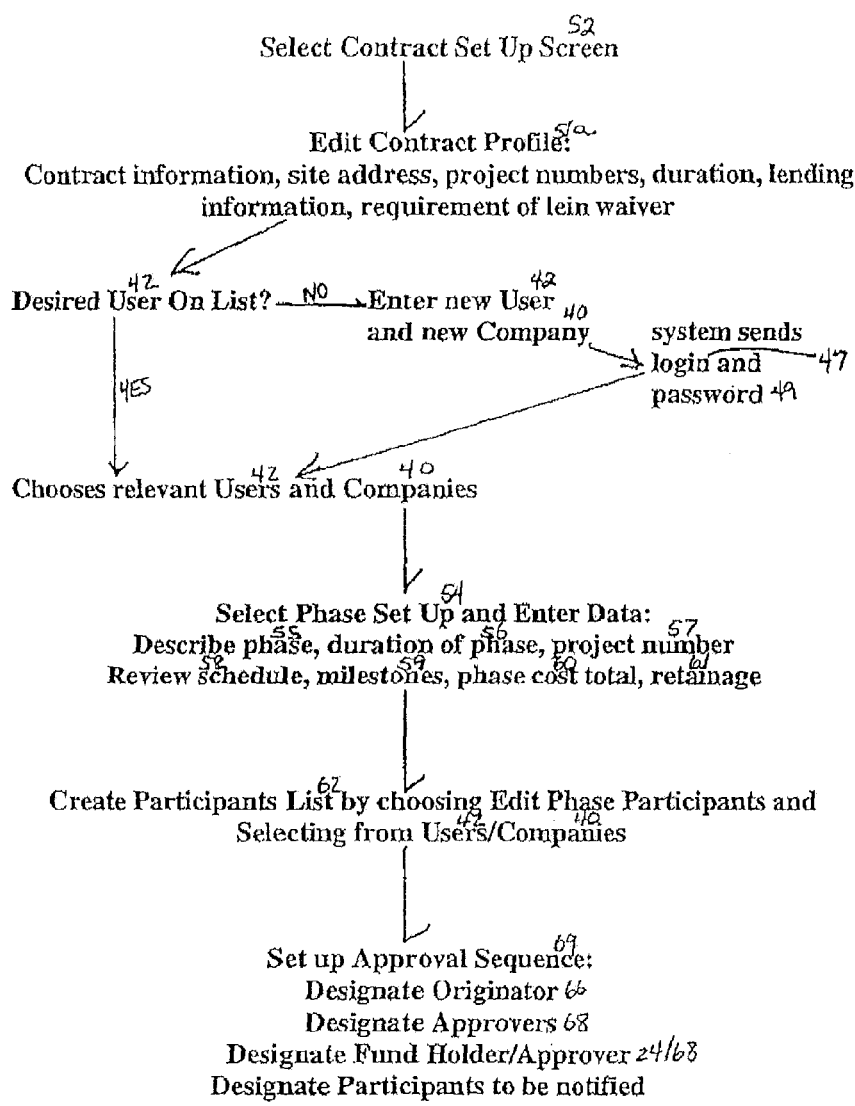
Figure 6A:
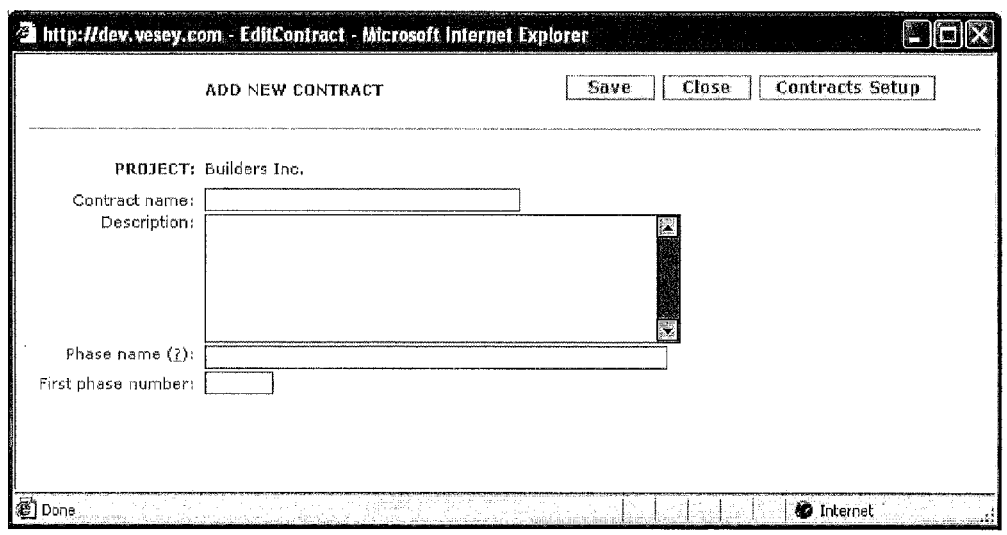
Figure 7:
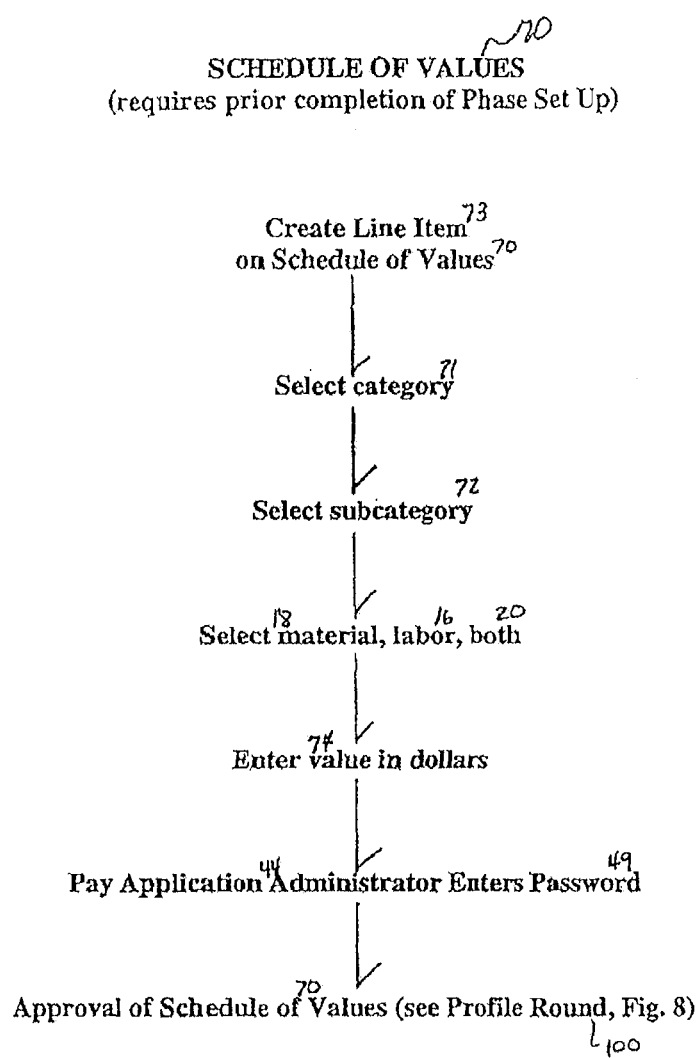
Figure 8:
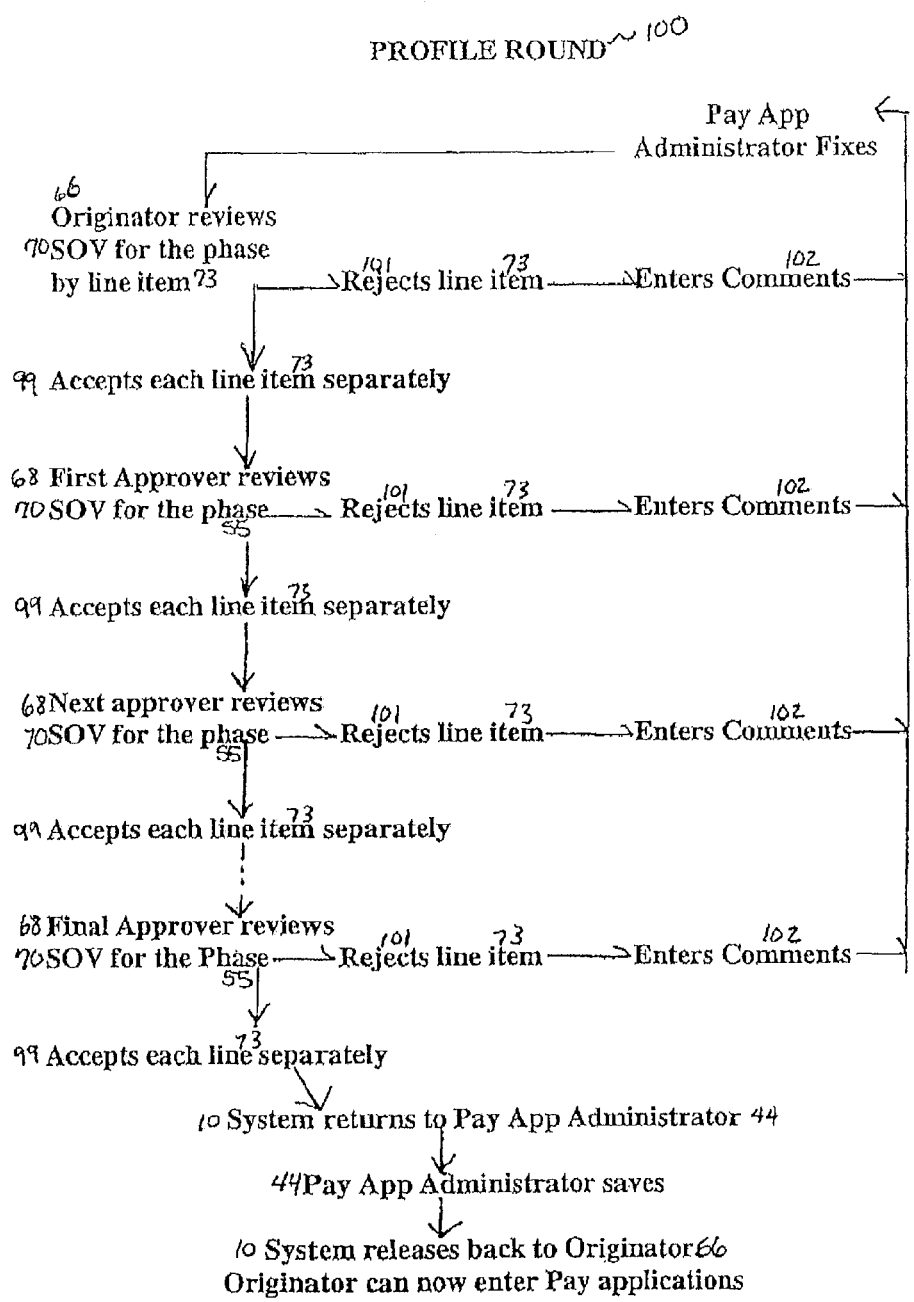
Figure 9A:
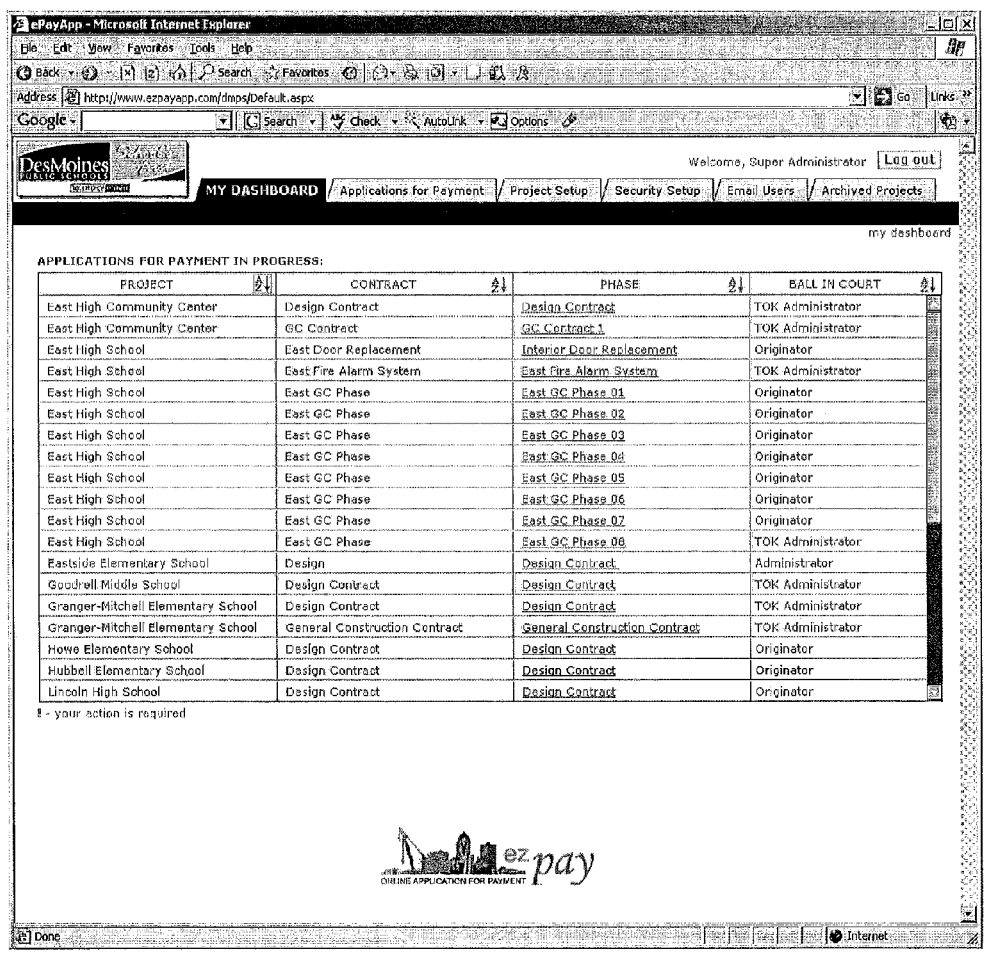
Figure 9B:
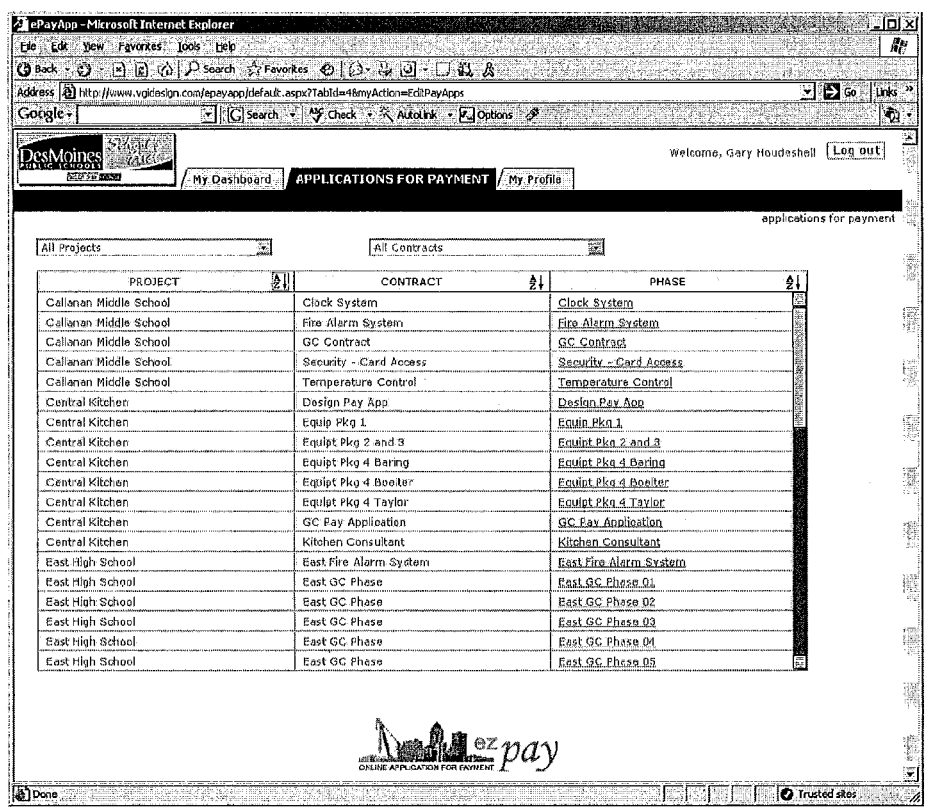
Figure 11:
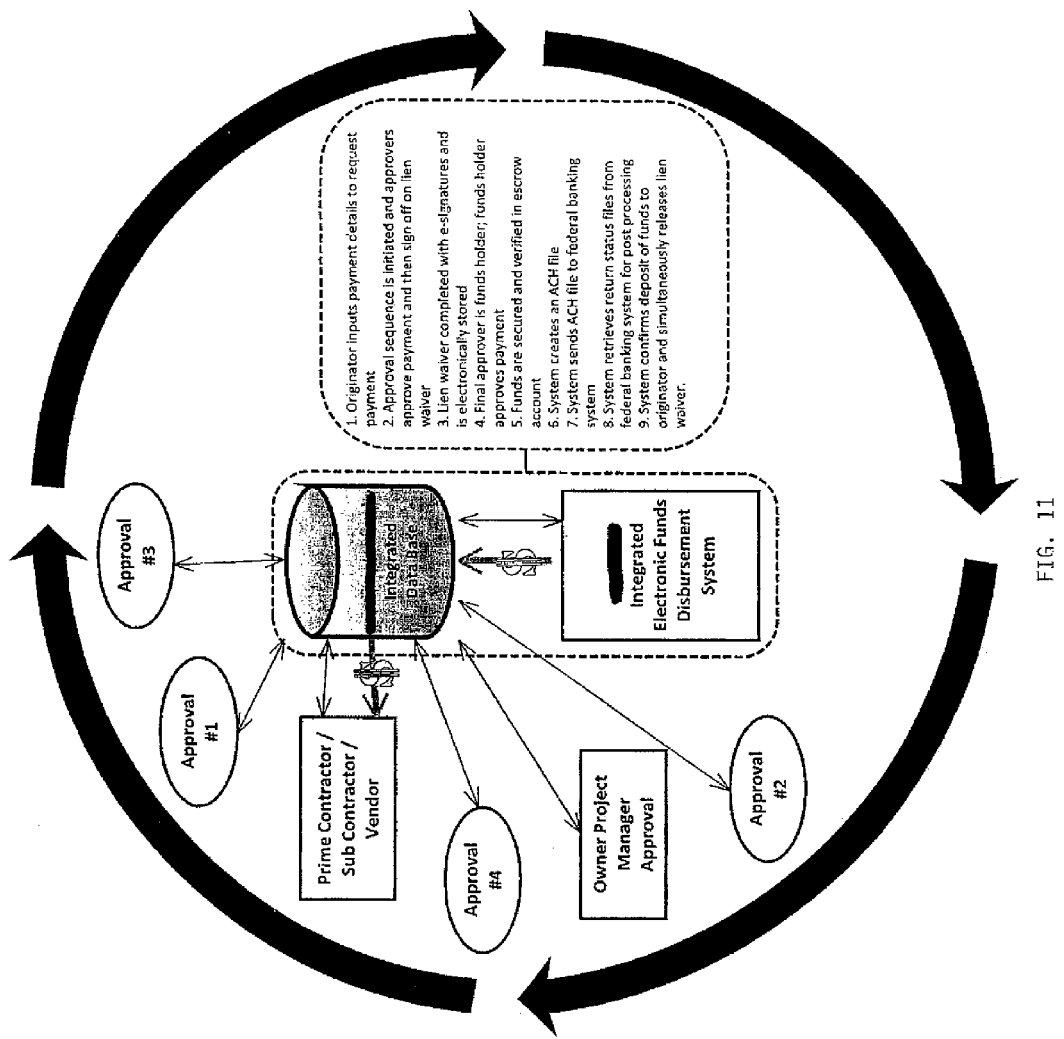
Figure 12:
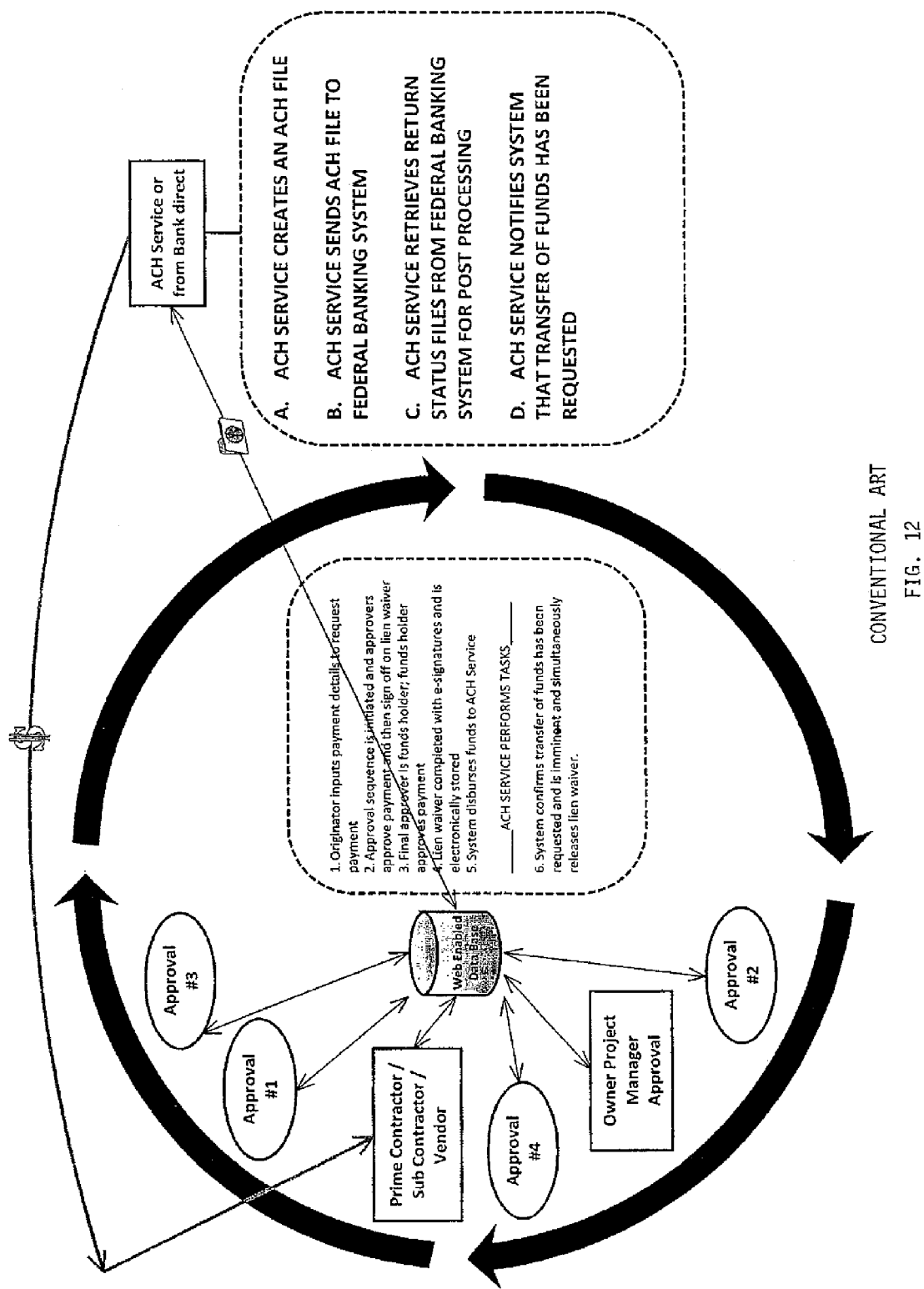

FIG. 1 Administrator's Flow Chart
FIG. 2 User's Flow Chart
FIG. 3 Approver Process Flow Chart
FIG. 4 Pay Process Flow Chart
FIG. 5 Project Set Up Flow Chart
FIGS. 5a-5j Screen shots illustrating the Project Set Up
FIG. 6 Set Up of Contracts and Phases Flow Chart
FIGS. 6a-6d Screen shots illustrating the Set Up of Contacts and Phases
FIG. 7 Schedule of Values Flow Chart
FIGS. 7a-7c Screen shots illustrating the Schedule of Values
FIG. 8 Profile Round Flow Chart
FIG. 9 Pay Application Process Flow Chart
FIGS. 9a-9h Screen shots illustrating the Pay Application Process
FIG. 10 Screen shot illustrating Retainage Release
FIG. 11 is a view of system in accordance with an example embodiment; and
FIG. 12 is a view of a conventional system.

DETAILED DESCRIPTION OF THE PREFERRED EMBODIMENT

The invention is a computer- and web-enabled multiparty, multicontract management system 10 best shown in FIGS. 1-4. The system 10 is implemented through the web by software that has certain operative functionalities found in other collaborative work software wherein an unlimited number of projects can be managed having an unlimited number of substages, tasks, and involved entities that access and interact through the system. The invention is described in terms of processes or steps some of which are initiated by the user, some of which are managed by the system. According to methods already known in the art, data entered will be checked against stored data, the system will check for data format as necessary and flag missing data where such data is critical. Communication protocols between networked computers accessing the system are used as known in the art.

As an example of a contract managed by the system 10 of the present invention, a construction project is used as illustration. Construction projects 11 often include a number of different contracts 12 each of which is made up of phases 14 which are typically task oriented. Phases require labor 16, materials 18, or both 20. The project is owned by an owner 22 and often funded by a fund holder 24 (e.g. financial institution). The entities that provide labor or materials or both are traditionally paid upon accomplishment of certain phase milestones 23 e.g. completion of a task, or portion of a task, delivery of materials, etc. In order to use the system 10 of the present invention to manage a construction project 11, the following functions must be understood and addressed: Project Set Up 30, Contracts and Phases Set Up 50, Schedule of Values 70, Profile Round 100, Change Order 110, Pay Application and Payments 120, Material Stored 82, and Reporting 300.

Project Set Up 30

The system 10 provides means for uploading of contract documents which may be viewed by various users. The Project Set Up 30 comprises means to assign multilevel party identity dependent accessibility 31. Means to assign multilevel accessibility 31 first requires the creation of security zones 36 and the designation of security zones 36 to certain entities. At least one entity must be designated a Super Administrator 32. The Super Administrator has the highest level of access to various parts of the system 10, is responsible for setting up a Project 34, assigning the Project 34 to one or more Security Zones 36, and setting up Administrator 38, Company 40 and User 42 accounts 43 with access to certain Security Zones 36, respectively. The Administrator 38 can also set up User 42 accounts. A Pay Application Administrator 44 is also designated and its function will be described in Contracts Set Up 50.

On a Project Form 46, the Super Administrator 32 simply enters a project name and description and designates a Security Zone 36 for the Project 34. Other details for the Project 34 can be stored here, as well. Once the Project 34 is set up, the Super Administrator 32 enters information about the Administrator(s) 38 for the Project 34 and designates the appropriate Security Zone 36. In a preferred embodiment, this information includes the Administrator's 38 name, email address, mailing address, agreement to be bound by electronic signature, and electronic signature block 49a. From here, the Administrator 38 or Super Administrator can enter User 42 information and designate an appropriate Security Zone 36 for that User 42. The system 10 then notifies each User 42 of its login 47 and password 49.

Set up of Contracts and Phases 50

Projects, Contract, Phases are interchangeable with labels such as Builder, Contract and Vendor or other such appropriate terms. Set up of Contracts and Phases 50 in the project can be simply accomplished. The Pay Application Administrator 44 first sets up the contract 51 in the Contract Set Up screen. He can then enter new Companies 40 or new Users 42 (or select from the list already in the system). The entry of a new Company or new User requires the completion of a series of data fields used for identification. In the preferred embodiment, the User profile further includes email address, position in the Company, his Logon ID, role, electronic signature block, and Security Zone access.

Once the Users 42 and Companies 40 are entered, the Pay Application Administrator 44 can go to "Phase Setup" 54 where he describes the phase 55, its duration 56, provides project numbers 57, sets up the review schedule 58 and records projected milestone dates 59, phase cost total 60, and retainage 61. Next, he designates the participants 62 for the phase 55 which include entities that can apply for payment on this phase and those that will provide approvals. Those that may apply for payment on this phase are called Originators 66. Those from whom Approval is required are called Approvers 68. Means to designate a sequence for approval 64 is provided whereby the Administrator 44 selects Approvers 68 from the participants' list 62 in the Order in which they must provide approval or rejection of this phase 55. The last Approver is often the Fund Holder 24. The system 10 also allows the Pay Application Administrator 44 to set up a list of participants that should be email notified relative to each Approver's 68 response to the application for payment, considered collectively as the Approval Sequence 69. Once the approval sequence 69 is entered, it and the other Phase information are collectively referred to as the Phase Description 65.

Schedule of Values 70

Once the approval sequence 69 has been entered, the Pay Application Administrator 44 may input all the necessary Schedule of Values 70 information. First, a category 71 and at least one subcategory 72 are chosen from a list which describes the Phase 55 in which a line item 73 of the Schedule of Values 70 will belong. Then, a selection is made whether the value 74 pertains to material 18, labor 16 or both 20, and the appropriate value 74 is inserted. The scheduled value 74 in dollars is then entered. A "Phase Description" 76 is the combination of the Contract and Phases Set Up 50 and the Schedule of Values 70. Once the Schedule of Values 70 is completed, the Pay Application Administrator 44 enters his password 49 to sign off and begins the Profile Round 100. Once the Profile Round 100 is complete (see below) the Schedule of Values screen 78 shows each line item 73 with identifying information and its scheduled value 74 along with other pertinent data including the cumulative sum of all previous pay applications collectively labeled previous application 79 as calculated by the system 10. Two columns pertaining to the Work Completed this Month 80, 81 are presented wherein one shows labor and material installed this month 80. The other shows labor and material installed plus material installed that was previously stored 81 and is followed by a number of columns pertaining to specificities of Materials Stored 82 (see Materials Stored section below). Calculated totals showing Total Completed and Stored to Date 84, Percent Completed 86, Balance to Finish 88, and Retainage Amount 90 are System-generated amounts also displayed, line by line, on the Schedule of Values 70 screen.

Retainage 90 is determined by the System 10 by applying the percentage entered at time of Contract Set Up. Retainage is released to the entities that have substantially completed their obligations to that line item when the line item on the Schedule of Values has reached "substantial completion" which, in the preferred embodiment, is set at 90%.

Profile Round 100

The Profile Round 100 follows the same approval sequence 69 as a Pay Application (to be further described in subsequent sections) will follow, however, the approval required here is not of a certain payment request but, instead, of the entire Phase Description 65. So, the Originator 66 looks at the Schedule of Values 70 on an item 73 by item basis. Means to accept or reject each line item 100a are provided. If the line item 73 is accepted 99, the Originator inputs his password 49. If a line item 73 is rejected 101, the Originator 66 may input a comment 102 specific to that line item 73, enters his password 49, and then the profile goes back to Pay Application Administrator 44 for fix. The Approvers 68 all get a chance to reject/approve each line item 73 as well. Rejections 101 with line item-specific comments 102 are returned to the Originator 66. Once approved and signed off by last Approver 68, it is returned to Pay Application Administrator 44 to save and release back to the Originator 66.

Change Order 110

Either by responding to a Request for Proposal or when needing to initiate a required change order 110, originator 66 who is a contractor may select the Change Order screen 112 and input the requisite information 114. The Pay Administrator 44 then selects the appropriate approvers 68 and initiates an approval round 116. If the Change Order 110 is approved, it becomes an Amendment 118 to the Contract and the Pay Application Administrator 44 then adds to the Schedule of Values 70. The requisite information 114 may also be imported from an outside system.

Pay Application Process 120

After the Profile Round 100 is complete, means to apply for payment 121 are available to the Originator 66. Means to apply for payment 121 allows the Originator 66 to originate a Pay Application 122 upon completion of a Phase Milestone 23 and comprises the following steps: First, the Originator logs into the Project 34, Selects the correct Contract 51 and Phase 55. Then, the Originator 66 selects one of the line items 73 from the Schedule of Values 70 for which he is requesting a payment 121a and enters information as required by the Payment Application Form 122 including entry regarding stored materials 82 (see Stored Material section below). He completes a Lien Waiver Form 124 as automatically provided by the System 10 upon submission of the Pay Application Form 122. The Lien Waiver Form 124 includes language releasing all claims relative to the work for which payment is being requested 126 and, upon entry of the Originator's 66 password 49, the System 10 applies the Originator's 66 electronic signature 49a to the Lien Waiver 124 and sends the Pay Application Form 122 along with a notice 126 that the Lien Waiver Form 124 has been completed to the first Approver 68. The first Approver 68 verifies the payment 121 by manually keying in the dollar figure for the payment 121. If this figure does not match that in the system, the system 10 will not accept it. This requirement acts as a safety door by requiring at least one of the approver's 68 to truly look at the payment 121 being requested. The system 10 provides means for the first Approver to indicate 127 a response. If rejection 130, means to indicate 127 allows the Approver to click the box for rejection and then enter reasons 132 therefore. Next, the system 10 removes all electronic signatures 49a from this Pay Application 122 and associated Lien Waiver 124, and sends back to Originator 68 with the reasons 132 for refusal.

When the first Approver 68 indicates approval, the means to indicate 127 approval 134 provides a check box and the system 10 then emails other entities as directed by the Phase Description 65. Upon first approval 134, next Approver 68 is notified there is a Pay Application 122 awaiting his approval 134 and he utilizes means to indicate 127 approval or rejection in the same manner. All other Phase Participants 62 can determine which Approver 68 is next in line by referring to the Schedule of Values 70 screen. The final Approver 68 is the holder of the funds 24 that are available to make the payment 121. Upon his Approval, the requested payment 121 is transferred to a System Account 136. The System 10 confirms the payment 121 has arrived and is available for transfer. Upon confirmation, the System 10 direct deposits the payment 121 in an Originator's 66 account 137 and sends the completed Lien Waiver 124 to the fund holder 124. This process expedites the completion of the transaction, does not require separate completion steps or double signing by the Lein Waiver signor or the Funds Holder, and provides certainty that the funds are present and transferred at time of the transfer of the Lien Waiver and vice versa. It does not allow a contractor or other individual to control the timing of payment nor does it suffer from the possibility that funds available in the payor's account at the time the system checks have already been used before the funds can be transferred to the payee.

The Set up of Contacts and Phases and of Users may include a level deeper than described above. Here, a phase description 65 would be that of a task 142 within a phase to be completed by a vendor 140 and a schedule of values 70 would be entered accordingly. The participants list 62 would include the vendor 140 and/or subcontractors. There would be a single approver 68 in this situation—the contractor for whom the vendor is providing materials/services. Upon completing the pay application form 122, the vendor 140 would be required to complete a Lien Waiver Form 124. Upon approval of the request by the approver/contractor 68, the Fund Holder 24 would release the payment 121 to the system 10, the system 10 would verify payment amount transferred, and system 10 would then forward the Lein Waiver 124 to the approver/contractor 68 and payment 121 to vendor 140. This process negates the temptation by the Contractor to hold funds while at the same time expediting the completion of the transaction without necessitating separate completion steps or double signing by the Lein Waiver signor or the Funds Holder. Controlled by Security Zones 36 and the Phase Participants List 62, the Vendor 140 would not have access to any parts of the system 10 other than the Phase and tasks 142 with which he has been linked and, then, only to request a payment 121.

Materials Stored 82

The System 10 stores and displays information regarding materials providing means to balance and report stored materials levels 144. Said means to balance and report comprises the following entry and calculated fields: Previous Materials Stored 150, New Materials Stored 152, Previously Stored Material Used 154 and Materials Presently Stored 156. A user 42 on the participants list 62 on a phase 55 can enter changes to New Materials Stored 152, and to Previously Stored Material Used 154. These columns are displayed on the Schedule of Values 70 relative to each line item 73 on the schedule 70. The Previous Material Stored 150 column shows the level of materials stored after processing the previous pay application and is a System-generated amount. Material Presently Stored 156 is a system calculated level showing the value of the materials stored past and present and for which payment has not yet been applied for. Total Completed and Stored 160 shows the value of materials obtained to date, both used and unused. In the preferred embodiment, means to balance and report stored materials levels 144 further comprises the requirement of uploading scanned document images 162 to the system 10 under the "Pay Application Support Documents" folder 164 in the Pay Application 122 tab prior to completion of a Pay Application 122. The documents 162 required include a proof of purchase 166 and an insurance certificate 168 on the location where the materials are stored. Without uploaded document images 162, the current Pay Application 122 including payment for materials will not be processed by the System 10.

Reporting

The system links all Budget Fields together and adjusts to changes in real time. For example, if a Contract or Phase is finished underbudget, a field holding the actual project balance is effected as is a field holding the actual Contract or Phase budget. Another example of linked fields is illustrated when, at set up, an Administrator indicates which independent Phases or Contracts must be complete before a particular dependent Phase or Contract can be started. Any changes to the independent schedule is automatically used to update the schedule of the dependent. Such an update may be set to require approval by a specified entity and, upon such approval, the schedule change will be communicated to all affected entities by email or intra-system messaging.

Management Features

The combination of certain features in the Phase Set up, Schedule of Values and Pay application and means for automatically updating certain data fields in response to new entries in linked fields provides means for contract management. Means for contract management provides information on contract progress and cost, phase progress and cost, and change orders.

Other Embodiments Include Expanded Features

Retainage

When setting up a contract the contract retainage is determined via a user interface that allows nearly unlimited flexibility to how funds are retained on a "per pay app" basis of retainage.

Retainage is typically a set percentage or dollar amount that is retained from the Contractor progress payment during the life of the project. Retainage is a tool to hold a portion of the project funds in escrow and to hold contractors (pay applicants) accountable to safeguard that the contract is fully executed to the owner's satisfaction and according to the plans and specifications.

Several retainage measures and parameters may be used to affect how retainage will be withheld and calculated. These retainage measures include percent, time, lump sum, or prorated across each pay request. The functionality enables the user to set up retainage on the contract level yet still provides the option to 'fine-tune' retainage on a per-originator basis. If they differ, the per-originator retainage parameters are set to override those on the contract level. The following release modes are contemplated by the present invention.

Per-Originator Retainage

The process allows the user to specify whether Retainage would apply to the original Schedule of Values only or globally (that is, including Change Orders). In case of the latter. The user may specify the 'ceiling' for Retainage (either 'unlimited' or 'not to exceed a certain $$ amount').

Apply Retainage Effective Range

This option allows the user to specify a set of thresholds in either percentage or absolute amount that will determine when Retainage would 'kick in' and when it would be turned 'off'. A lower limit related to when Retainage kicks in can be set. The upper lit may also be set.

Release Proportionally Across all Schedule of Values Items

This option defines retainage to be released equally across all Schedule of Values (SOV) items.

Release at Each Schedule of Value Item Individually

This option defines that retainage would be released on a per-SOY-item basis.

Retainage Not to Exceed

The measure allows the user to set the upper limit of retainage amount and is enabled only if Apply Retainage to Change Orders option is on. It can be specified either in percentage terms or in terms of money.

Retainage Release

Retainage release is a very important part of a complex project. There are many factors that go into allowable retainage release. The norm, however, is the Contract Sum to Date must equal Total and Completed and Stored to Date. In other words the financial value of the contract must equal the work completed before the retainage is released. Release can be managed in several different modes Released either by % or $ proportionally across all SOV's
Released either by % or $ at each SOV line item
Released either by % or $ for any sub contract either proportionally or by SOV line item There are many State and Local laws, however, that permit EARLY release so work completed by sub-contractors early in a project are not harmed financially by long project duration, hold backs or claims against the project. Therefore, in a preferred variation of the system, if labor and materials are yet to be provided at the time the request for the release of the retained funds is made, an amount equal to a set multiple of the value of the labor or materials yet to be provided, as determined by the Owner entity's authorized contract representative, may be withheld until such labor or materials are provided. The same is also true for other "hold backs" like a claim on the project for example.

Early Release or Partial of Retained Funds can be accomplished via a number of features including:

1. A feature in contract setup to allow override of the default setting of Retainage Release Unlock. The default setting is automatic when Contract Sum to Date=Total and Completed Stored to Date. The override feature results in Retainage Release Unlock only for SOV line items that are at 100% complete.
2. Another feature in Contract Setup may allow an override to allow the user to insert a percent amount that will automatically calculate Balance to Finish amount against the Total Amount of Retainage Released. (200% or other multiple) If exceeded during the Partial Release process then an error dialog box will provide notification that the amount has been exceeded. An adjustment to the SOV line items can be made to result in an amount below the calculated threshold.
3. The system provides accounting for the SOV release process. Specifically, the following statuses are provided but it is contemplated that the system may be altered to provide other means of tracking and status.
    a. Retainage Amount at 100% Complete
    b. This Period Retainage Released
    c. Previous Retained Released
    d. Present Retainage
4. Finally, a preferred embodiment of the system includes such features as:
    a. A log of release that is "selectable" to the USER so as he/she can view a history of released activities.
    b. A heads up dynamic display showing the running total of retainage release and "Balance" to reach the 200% (or other multiple) threshold.

This concept is illustrated in FIG. 10

Resource and Allocation

The system allows for a sophisticated resource and allocation tracking tool. Corporate or public entities that must plan for large complex projects usually need to budget for their upcoming projects. This information is most likely held in spreadsheets. As projects are set the entity allocates funds to each of several projects and then also enters the contracts parameters for each project. Even more complex is the notion that shared projects across multiple entities require careful and precise accounting of project resource and allocations. Once again User collaboration, transparency and approval play a central role. Features of the Resource and Allocation tracking tool include:

1. User control of others allowed to view or perform tasks related to data;
2. Real-time reporting
3. Links to other functions in the system The ability to request and approve funding includes funding related to a period of time, for specific projects, individuals, groups and/or departments and functionality that allows the user to add detailed information about the request are also provided. Finally, the user may prorate a funding request across other entities that will be contributors. The funding request may be phased or integrated with project scheduling and additional resource and Allocation function may allow setting of minimums and maximums or range of funding complete. The system then monitors the funding and provides notification to the appropriate user when projects or Contracts are getting within a prescribed range of either.

Once funding becomes a resource it can be allocated to security zones, projects and then also to contracts (or to a phased project with integrated scheduling). The system also allows functionality to remove funding or put funding on hold.

The funding allocation and resource feature, as preferred, allows each security zone to see available funding and to which projects and contracts. If projects or contracts have not been created, then they can be created at this time and may be directionally attached so various users with differing roles in a project may have access to the resource and funding information.

Net Payment

A NET payment functionality is provided to allow an Owner or funding source to take a credit on a payment if it is paid in a shorter time period than the normal 30 day cycle. This functionality will have major consequences to the Owner, project and contractor. The Owner can take advantage of prompt payment business acumen and credit back a small percentage in exchange for the prompt payment. The contractor can better cash flow their projects closer to when money is earned, provide higher quality and skilled tradesmen, lower their credit line and be more liquid and be able to negotiate even better terms with their material providers and sub-contractors. The project will benefit from increased velocity, higher level of quality, reduced risk and costs.

Features of the NET PAYMENT functionality are:
1. NET Payment schedule setting several time related events and different credit levels e.g. 3% NET 5 days, 2% NET 10 days, 1% NET 15 days
2. Full visibility and transparency to the Admin, Owner, Originator and Approvers of the NET Payment schedule in the Contract Summary
   a. Showing current credit taken per pay applications
   b. Showing summation across all pay applications
3. Date and time stamp of Pay Originator and sign off of Approval Sequence that counts down the days left to each NET Payment schedule. This may be preset.
4. Project and Contracting reporting of credits taken
   a. By date or other time duration
   b. By project or contract
   c. By company and/or individual
5. Lien waiver or other contingent document functionality is included; the credits are automatically accounted for in all escrow functions.

Unit Pricing Functionality

Vertical infrastructure projects mostly follow a prescribed path of providing a detailed schedule of values or work breakdown structure to describe the total contract value. As such the Originator then invoices against the scheduled value until the Total Completed and Stored to Date equals the Contract Sum to Date. With horizontal infrastructure, like roads and bridges, the schedule of values is handled differently. The process is usually broken down into quantities of material and not a scheduled value. Additionally there is a closer relationship between the Owner's representative, the contractor and material provider. There is a tight collaboration on the project site to verify and quantify labor and material on a daily basis. A web enabled process related to a horizontal infrastructure will offer many time, human and money savings.

1. Projects and Contracts would be set up as previously described herein.
2. Changes to the Schedule of Values in a preferred embodiment would be provided in this order:
   a. Division Item. This is the organized structured break down usually governed by state, local or profession organization
   b. Description. Division description
   c. Units. Acronym for units of measure like Linear Feet, Cubic Feet.
   d. Original Proposed Quantity. A value based on the Unit
   e. Quantity Change by Change Order. A value based on Unit
   f. Total Quantity. Summation of Original and Changed Order quantities
   g. Unit Price
   h. Materials Stored columns as previously described.
   i. Extended Price. Calculated price for Total Quantity and Unit Price
   j. Quantity Complete. Summation of Original and Change Order Quantities
   k. Value of Completed Work. Total line item value of original and Change Order Values
   l. Percent Complete. Calculation of completed work over scheduled work.
   m. Retainage. Calculation of retained funds per line item of Value of Completed Work multiplied by the contract retainage
3. The system would provide document storage capabilities as well as bar code readers. For material providers or other entities that are not web enabled an alternate system must be in place. An example employing a fax machine rather than direct entry into the system may include:
   a. Issuing a Cover Sheet with a bar code or unique identification numbers that targets the project, contract, task or system for that day or weeks work
   b. The Cover Sheet is physically provided to, for example, a material vendor.
   c. Upon completion/filling of an order, the vendor faxes the provided cover sheet to the system which is programmed to receive the fax via the web and read the barcode. The barcodes is used to route the information to the correct project, contract and folder in pdf form and name it. Thereafter, the system makes the information available to those with appropriate occurs. Smartphones and other tools also contemplated in addition to fax cover sheets.

Hourly And Time Based

Many public and private entities often times will create projects and contracts that utilize a time and material based structure to get certain tasks or work done this method of accounting for work performed is preferred where either estimates or the project do not require a detailed breakdown for contractual reasons. This may be in conjunction with projects and contract based on schedules of value and/or quantity based invoicing structure.

1. Projects and Contracts can be set up
2. The system then provides Admin functions above and beyond just setting up companies and individuals. These functions may include any or all of the following:
   a. Creation of a work structure, descriptions and job tasks
   b. Creation and application of hourly rates based on work functions and type
   c. Creation and application quantity based descriptions
   d. Creation and application of retainage or other hold backs
   e. Creation and application of column headings in preferred order for the project or contract
3. User functions
   a. Creation and application of divisions and descriptions of work from a drop down list
   b. Selection of the hourly rate for the type of work function
   c. Tool to allow insertion/tracking of time. Ability to insert time
   d. Uploading of supporting documents on a line item, project or contract basis
   e. Creation of ad-hoc task estimates on a project, contract or line item basis The system also provides application of these functions relative to the waiver function.

Self-Serve Application

Finally, a different twist on the system is provided. This version does not include approvers but, instead, allows a user to employ many of the system's features to track progress, recycle pay applications with all the calculations completed automatically, and gain critical reporting information. Details of the Stand Alone version include: User access via a specifically designed portal and functionality for purchase via credit card a single or block of projects and contracts 1. The "system" will then allocate the capacity to create the number of projects and contracts purchased.
2. Once allocated the User will be able to set up resources and allocations, companies, users and any variation of project and contract type.
3. Lien waiver and other contingent document functionality is included in this version and operates generally as previously described but for the fact that there are no approvers.
4. The User will be able to assign or provide access to others that will be able to view or change information in a project and/or contract
5. The application will function exactly the same as previously described but it does not include the Approval sequence or the escrow function.

A. Flexible/Expandable SOV

Allows for addition or subtraction of key contract SOV parameters. Examples would be to be able to break down SOV line items by Phase, Sequence or Area.

B. Chat/txt/Social Media Portal Connectivity

Captures, retains, utilizes and collaborates on relevant Project or Contract instant dialog that attaches to a project, contract and/or individual pay application.

C. Geo Spacial Referencing

Every project has its roots tied to a location on earth. Geotagging the project location would enable the Users to gain access to other web content to serve up critical project information that is relevant to the people, companies and the like providing goods and services to the project. Each User would be able to check and un check content providers that may be relevant to their project.

D. Globalize

A module is included to increase capacity for multi-cultural interaction. Examples include conversion of currency, language that would be role centric. For example on an international project there could be a German Originator with French, English and Italian Approvers. Each user would be able to see the information in their own language and currency.

E. Contract Execution Functionality

The proposed final contract may be either scanned and uploaded to a document holder and then an execution sequence would occur wherein Admin, Originator and Approver sequences are employed. This new functionality would allow project Owners to originate, collaborate, approve and reject the contract process similar to the system's pay application process. Key components are the ability to create and edit contract templates, to link into the Resource, Allocation and Pay Application process as one continuous seamless event, to have internal and external routing, to revise and mark up comments and revisions, to retain revision history, to retain dollar values, to have unlimited amendments, to retain and integrate Change Order amendments, to have digital signature approval, retain scanned and/or other imaged documents, to approve, reject and reroute the contract during negotiations both internally and externally, and to archive as an original.

F. Expanded Change Order Functionality

When a contract is written and perfected there are only a few options to amend the dollar value with additions and deductions. This is called the Change Order process. The change order process allows additive and deductive amendments to the original contract. This process is similar to the contracting and pay application process requiring an admin, originators and approvers. The system allows the dollar value of change orders but not the process itself. This new functionality would allow project Owners and Originators to originate, collaborate, approve and reject the change orders process similar to eznetpay's pay application process. Key components are the ability to create and edit contract Change Order templates; link into the Resource, Allocation Contract and pay Application process as one continuous seamless event; have internal and external routing; to revise and mark up comments and revisions; retain revisions history; to retain dollar values and change order descriptions; have unlimited amendments; have digital signature approval; retain scanned and/or other imaged documents; approve, reject and reroute the contract during negotiations both internally and externally; archive as an original.

Account Conversion

Each business sector, vertical or industry follows an accounting and financial system best suited for their profession. It is not uncommon for dissimilar industries to provide goods and services to each other. It is no wonder then why invoicing, accounts payable, receivables and other business functions are all paper based. All accounts, items, PO's, addresses . . . must be manually input from one business structure to fit another. This is also true with the construction industry for example. Accounting "best practices" and financial structure for contractors are not the same as the project funding source like a school district for example. The contractor Schedule of Values or Work Breakdown Structure account codes are completely different than a school districts. This is one the major reasons paper invoicing continues today.

The system has the capability to map the Originator's account codes to that of the funding source providing an electronic means of conversion from one system to another. Important features and abilities are provision of commands to set rules that can individually or group account codes to both the Payee or Payor wherein the account codes may be numerical and/or alphabetical and in any combination once defined either account code can be mapped to the other in any combination or sequence or by a given set of business rules; the account codes may be grouped by project, contract, company, individual, phase, area, date, time or any combination.

once grouped, the account codes can be converted or translated to each other by project, contract, company, individual, phase, area, date, time or any combination. Upon translation, the codes can be summed and reported by project, contract, company, individual, phase, area, date, time or any combination and may be exported to other file formats that support reading and writing of structured data.

Thus, the present invention has been described in an illustrative manner. It is to be understood that the terminology that has been used is intended to be in the nature of words of description rather than of limitation.

What I claim is:

1. A web enabled multiparty multicontract project management process comprising:
a) storing, with a computer processor, information required to manage at least one contract comprising at least one contract set up and at least one phase set up;
b) assigning, with a computer processor, multilevel, party-identity dependent, accessibility by unlimited authorized users wherein said users include at least one pay application originator having an account, at least one pay application approver, and a funds holder;

c) providing, with a computer processor, information on contract progress comprising budget and costs to date, phase progress, phase budget and costs to date;

d) balancing and reporting, with a computer processor, stored materials levels;

e) designating, with a computer processor, a sequence of a plurality of approvers for a selected phase;

f) receiving and processing, with a computer processor, a request for payment from said pay application originator and a signed waiver form;

g) withdrawing, with a computer processor, funds from an account held by said funds holder, deposit said payment into an account controlled by said process and substantially simultaneously transfer said payment to the originator's account and release said signed waiver form to at least one said approver.

2. The web-enabled process in claim 1 wherein said payment is determined based on at least one contract, a list of phases associated with said at least one contract, a schedule of values associated with each said phase comprising a scheduled value and timelines for each line item from a pay application, and a completed waiver form including an electronic signature.

3. The web-enabled process in claim 2 wherein a sequence of a plurality of approvers is designated to a selected phase of an appropriate contract, a desired phase, and a plurality of participants in the phase.

4. The web-enabled process in claim 2 wherein said initiation of said sequence comprises notifying each in said sequence of approvers, of said signed waiver form and recording each said approver's response to said pay application.

5. The web-enabled process of claim 1 further comprising a schedule of values wherein said substantially simultaneous deposit of the payment and release of said signed waiver form comprises causing the processor to effect the steps of recording a selection of a line item from the schedule of values, displaying the waiver form to a pay application originator in response to completion of said request for payment; recording completion of said waiver form; sending said request for payment and notice of completion of said waiver form to each approver in said sequence of approvers wherein the last of said sequence is the funds holder.

6. The process of claim 1 wherein said storage of information required to manage at least one contract further comprises storing a retainage proportion to be released upon reaching a retainage measure, and said subsantially simultaneous transfer of said payment and said signed waiver form.

7. The process of claim 6 wherein said retainage measure comprises at least one selected from a group consisting of a set percentage, a set amount of time, a lump sum, and a proration per pay request.

8. The process of claim 1 wherein said storage of information further comprises a retainage portion and an indicator selected from a group consisting of contract level, originator, or subcontract.

9. The process of claim 1 wherein said storage of information further comprises a retainage portion and at least one indicator.

10. The process of claim 1 wherein said storage of information further comprises a retainage portion and said process further comprises a retainage release mode.

11. The process of claim 10 wherein said release mode comprises a per originator percentage.

12. The process of claim 1 wherein said storage of information further comprises a release mode.

13. The process of claim 1 further comprising instructions that cause a processor to manage allocation of funds to said at least one contract.

14. The process of claim 1 further comprising instructions that cause a processor to manage resource allocation to said at least one contract.

15. The process of claim 1 further comprising a net payment functionality comprising setting at least one time related event and at least one credit level.

16. The process of claim 1 further comprising a unit pricing functionality.

17. The process of claim 16 wherein said unit pricing functionality is associated with a process comprising a horizontal infrastructure.

18. The process of claim 1 further comprising a time and materials functionality.

* * * * *